Jan. 3, 1956    O. J. BUSH    2,729,406
ZERO-LENGTH LAUNCHER FOR AIRCRAFT
Filed Feb. 1, 1952    5 Sheets-Sheet 4

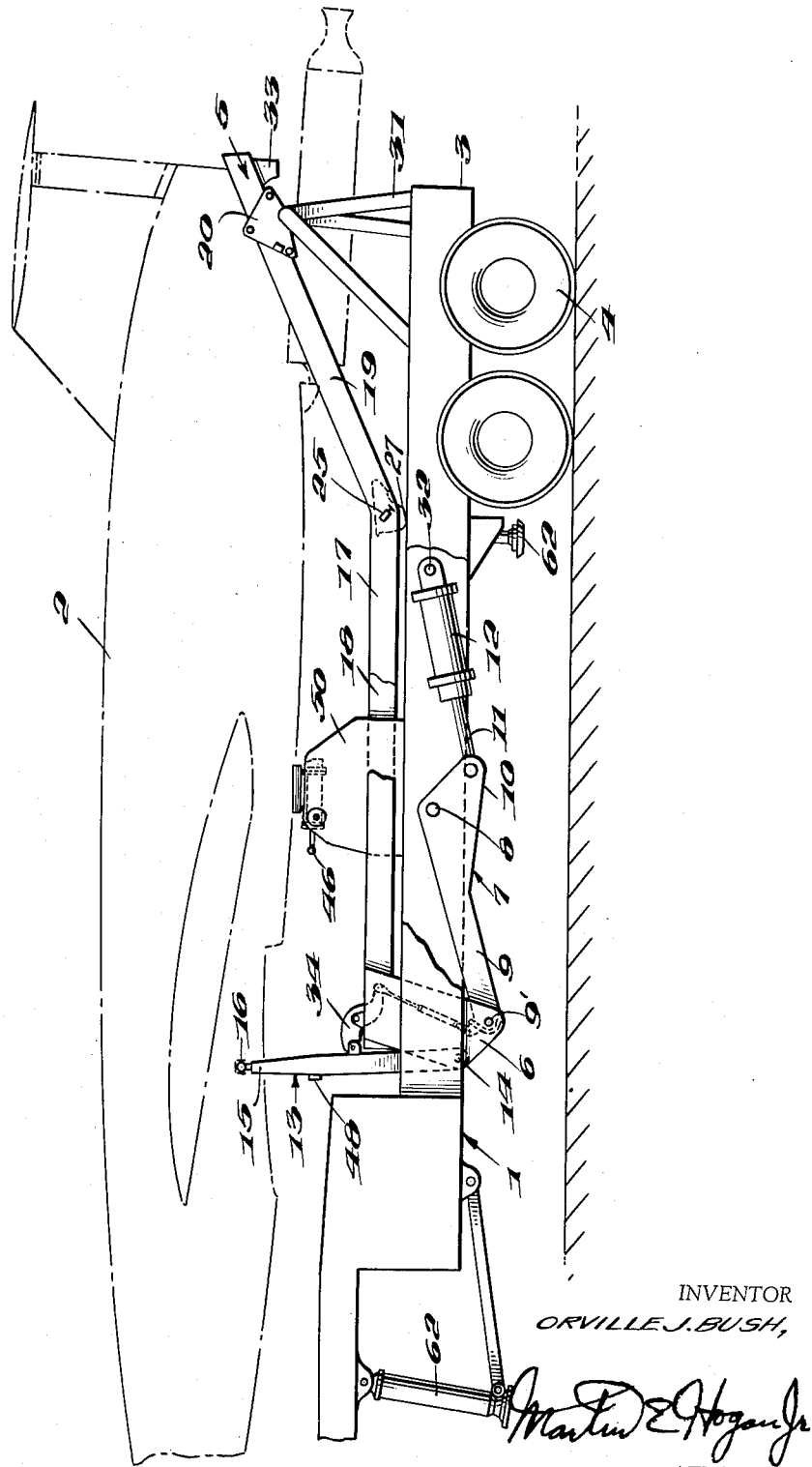

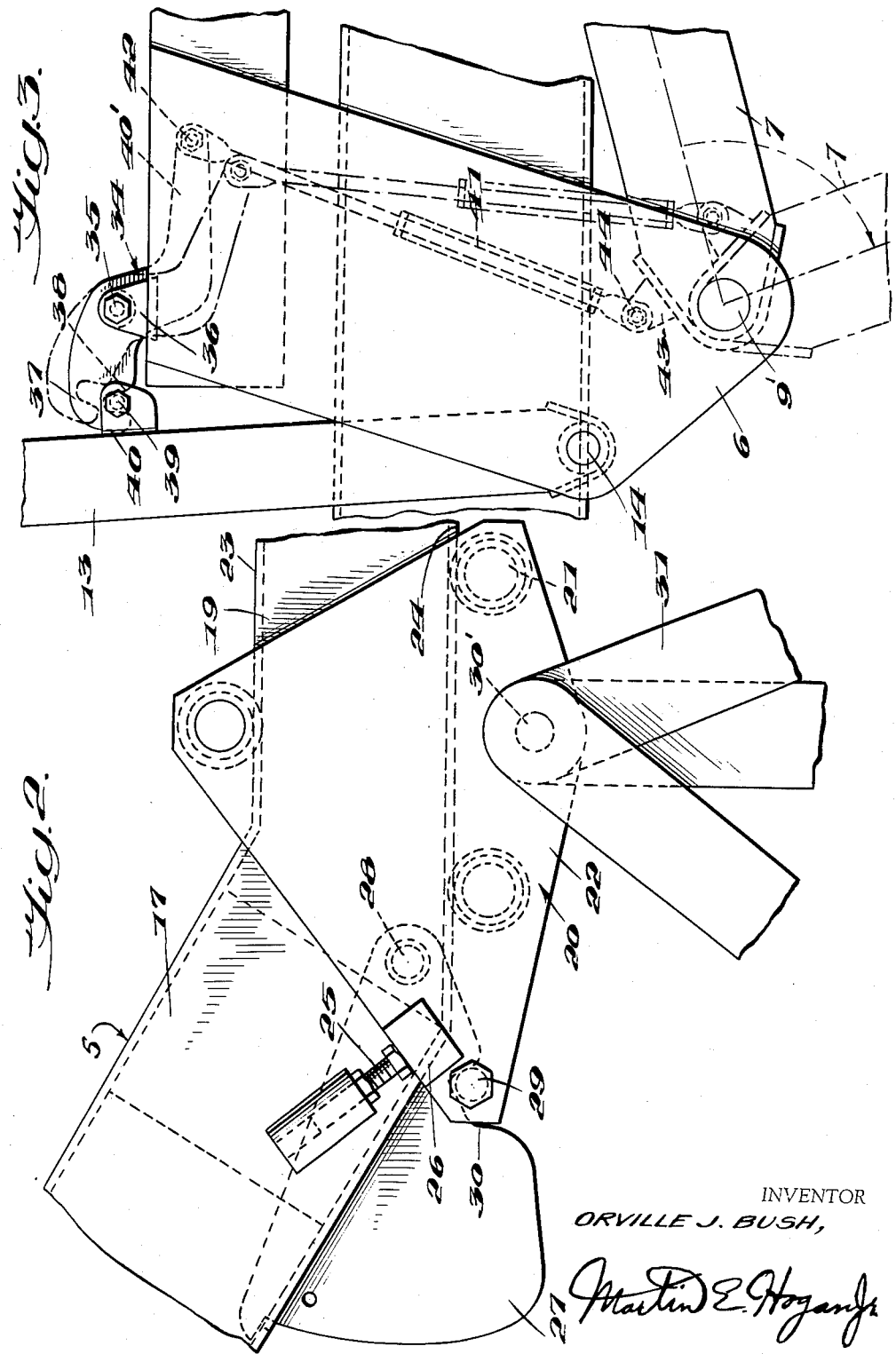

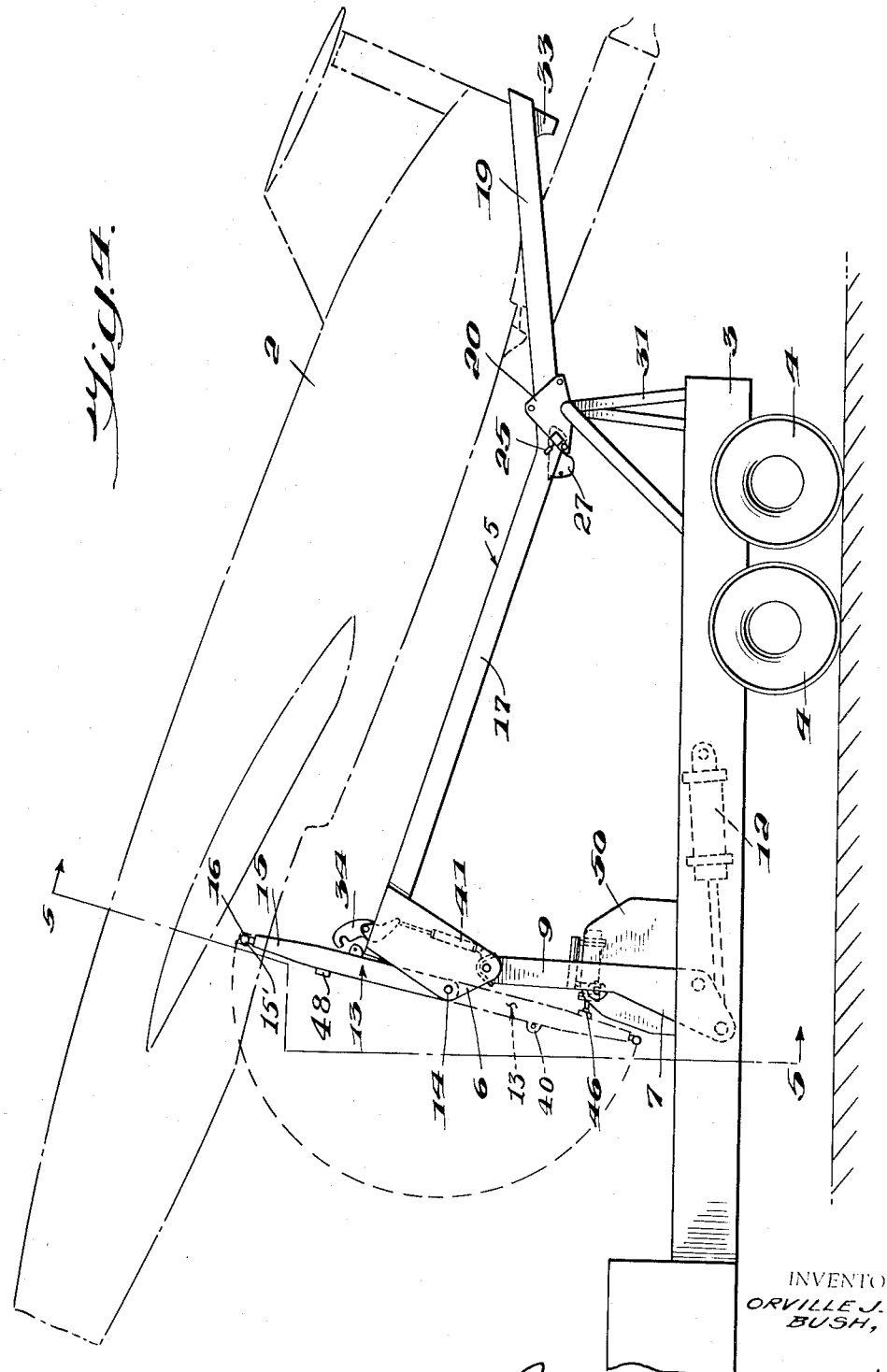

INVENTOR
ORVILLE J. BUSH,
BY [signature] Martin E. Hogan Jr.
ATTORNEY

Jan. 3, 1956 O. J. BUSH 2,729,406
ZERO-LENGTH LAUNCHER FOR AIRCRAFT
Filed Feb. 1, 1952 5 Sheets—Sheet 5

INVENTOR
ORVILLE J. BUSH,
BY
ATTORNEY

United States Patent Office 2,729,406
Patented Jan. 3, 1956

2,729,406

ZERO-LENGTH LAUNCHER FOR AIRCRAFT

Orville J. Bush, Joppa, Md., assignor to The Glenn L. Martin Company, Middle River, Md., a corporation of Maryland Application February 1, 1952, Serial No. 269,485

7 Claims. (Cl. 244—63)

This invention relates generally to aircraft launching devices and more specifically to a zero-length launcher adapted for use with aircraft of the type provided with sufficient power during take-off to support its own weight against the force of gravity while accelerating to flying speed. This is accomplished, for example, by releasably mounting a booster rocket on the aircraft so that its thrust line is aimed, relative to the aircraft center of gravity, so as to provide thrust components of sufficient magnitude and direction to control the aircraft along a predetermined flight path until it is capable of continuing the flight in a normal manner.

Such a technique obviously requires precision timing and control to be successful. The launching attitude of the aircraft must be so related to the thrust axes of the powerplants that when flying speed is attained, the aircraft will be in a flyable attitude. The launcher must support the aircraft in this attitude without interfering with its forward motion during launching since any restraining forces acting on the aircraft would alter its flight path and cause upsetting moments to develop.

The advantages offered by this launching system are evident, especially from a military standpoint. Not only is there no need to prepare runways, but aircraft may be sent aloft from any tactical location upon short notice.

As an object of this invention, the launcher described herein is adapted to provide a means whereby the zero-length launching technique described above is made practical for aircraft.

Another object of this invention is to provide a launcher adapted to eliminate the need for landing gear in aircraft for take-off.

Another object of this invention is to provide a launcher adapted to also serve as a transport for carrying aircraft swiftly and conveniently to any desired launching site.

Still another object of this invention is to provide a launcher adapted to support an aircraft so as to prevent relative movement thereof from a desired position and yet not interfere with the aircraft movement during launching so as to alter its normal flight path.

Further and other objects will become apparent from the accompanying description and drawings which form a part of this disclosure and in which like numerals refer to like parts.

In the drawing:

Fig. 1 is a fragmentary side view of the launcher in the retracted position.

Fig. 2 is a side view of a portion of the launcher bed and rear support.

Fig. 3 is a side view of the forward portion of the launcher bed and arm locking mechanism.

Fig. 4 is a side view of the launcher in the launching position.

Fig. 6 is a fragmentary side view of the shock absorber and mounting therefor forming part of the launcher, and, Fig. 7 is a fragmentary perspective view of the rear end of the launcher bed 5.

Figure 5:
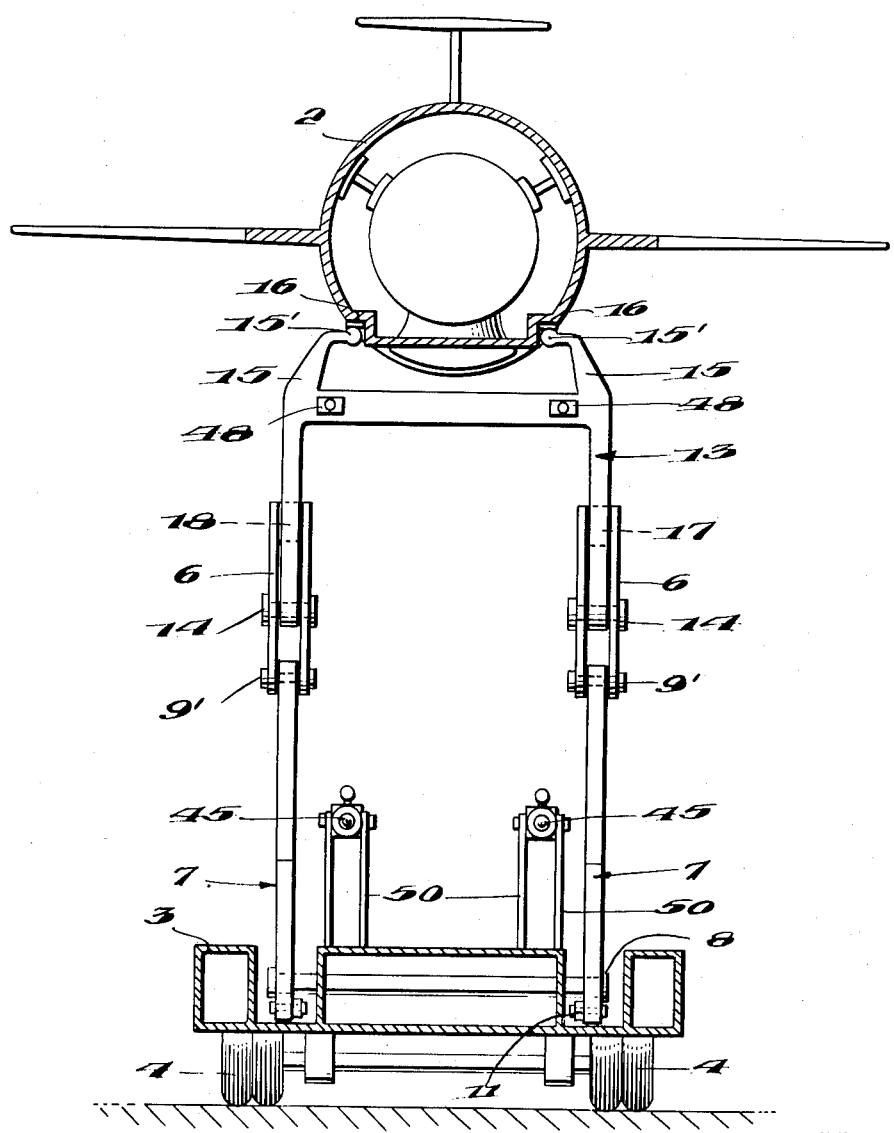
Fig. 5 is a view taken on line 5—5 of Fig. 4.

Launcher 1, in its retracted position, shown in Fig. 1, is adapted to support an aircraft 2 for conveniently transporting it to a desired launching site. As shown in the drawing, launcher 1 includes a frame 3 mounted on wheels 4 much like a conventional trailer. The aircraft is carried by a retractable bed 5 forming a part of the launcher. Bed 5 includes a pair of spaced beams 17 and 18 extending generally longitudinally of the frame. A cradle 33 rigidly connecting with beams 17 and 18 and extending transversely thereof adjacent the rearwardmost end of bed 5 is adapted to support the tail portion of the aircraft. A support arm 13 swingably carried by pins 14 on the generally downwardly extending forward portions 6 of each beam 17 and 18 of bed 5 provides support for the forward portion of aircraft 2.

As best shown in Fig. 5, arm 13 includes a pair of legs 15 having spherically shaped tip members 15' for engaging recesses 16 formed in aircraft 2 on either side of the fuselage. This arrangement cooperating with cradle 33 provides a stable support for the aircraft. By having recesses 16 substantially the same size as tip members 15', longitudinal movement of aircraft 2 relative to the launcher is made dependent upon arm 13 swinging about its pivot. Therefore, by locking arm 13 in the position shown in Fig. 1 relative to beams 17 and 18, relative movement of the aircraft is prevented.

A bellcrank 7, one for each beam 17 and 18 of bed 5, is pivotally carried by frame 3 through shaft 8 for raising the bed into a launching position as shown in Fig. 5 from the retracted position shown in Fig. 1. One arm 9 of the bellcrank 7 pivotally connects with the generally downwardly extending forward portion 6 of each beam 17 and 18 through pin 9'. The other arm 10 of each bellcrank 7 pivotally connects with a rod 11 of an actuating cylinder 12 pivotally carried by pin 32 on frame 3. By operation of actuating cylinders 12, so as to cause rotational movement of bellcranks 7, it is seen that the forward end of bed 5 will move upwardly and rearwardly in an arc about shaft 8 from the retracted position shown in Fig. 1.

The rear portion 19 of each beam of bed 5 is formed as a track for slidably engaging a track guide 20. The rear portion or track 19 of bed 5 is angularly displaced from the rest of the beam so that as bed 5 is raised to its extended position shown in Fig. 4, aircraft 2 will be in the desired attitude for launching. The detail construction of track 19 and guide 20 is most clearly shown in Fig. 2 wherein bed 5 is raised to the launching position. A plurality of rollers 21 are carried by a generally triangular shaped frame 22 so as to engage the upper and lower surfaces 23 and 24 of track 19 to allow only longitudinal movement of the track relative to guide 20. In order to limit the generally rearward movement of bed 5 when extended, a stop means 25 is provided on each beam of the bed so as to engage an abutment 26 formed on frame 22.

Means is also provided for locking the bed in its launching position. This means consists of a latch 27 pivoted to bed 5 at 28 for engaging a pin 29 carried by frame 22. When the bed is moved to the launching position, pin 29 engages a notch 30 formed in latch 27 to prevent forward movement required to lower the bed. To release latch 27, it is manually raised to a position wherein notch 30 disengages pin 29.

As is obvious from Figs. 1 and 4, track 19 moves angularly as well as rearwardly relative to frame 3 as the bed is raised to the launching position. This angular movement is permitted by pivotally carrying rail guide 20 on tripod 31 through pin 30' as indicated in Fig. 2. Tripod 31, rigidly carried by frame 3, provides an efficient structure for resisting the loads applied by the aircraft during launching.

To restrict the relative movement of aircraft 2 when the launcher is in its retracted position to serve as a transport, an automatic locking mechanism is employed to prevent swinging movement of arm 13 as best shown in Fig. 3. This mechanism consists of a pair of latch arms 34 pivoted at 35 to brackets 36 secured to each beam 17 and 18. One end 37 of each arm 34 is provided with an open-ended slot 38 adapted to engage a pin 39 secured to a bracket 40 on arm 13. As is seen from the drawing, arm 13 is locked in position when pin 39 is in engagement with slot 38 on latch arm 34. The other end 40' of latch arm 34 extends beyond pivot 35 to pivotally connect with one end of a rod 41 through pin 42. The other end of rod 41 is pivotally carried by bracket 43 through pin 44. Bracket 43 is fixedly secured to bellcrank 7 adjacent pin 9' connecting the bellcrank with bed 5. As the aircraft is raised to the launching position, relative movement between bellcrank 7 and the bed causes arm 34 to be moved to an unlocked position, as indicated in Fig. 3 by dotted lines. When the lock is in this position, arm 13 is free to pivot about pin 14 during launching.

The large forces required for the aircraft to become airborne immediately, result in producing very high accelerations which cause corresponding accelerations in arm 13 about its pivot point 14 as the aircraft leaves the launcher. This energy imparted to arm 13 in addition to the energy added due to its own weight, will be sufficient to cause the arm to swing back into the aircraft flight path if not restrained. A pair of shock absorbers 45 are therefore employed, as best shown in Figs. 5 and 6, to absorb the kinetic energy in arm 13 as it is swung to a position out of the aircraft flight path. Piston rod 46 of each shock absorber 45 is provided with a generally spherically shaped tip portion 47 for contacting a pad 48 secured to arm 13. The seating surface 49 of pad 48 is generally concave so as to seat the spherical tip portion on piston rod 46. As shown in the drawing, when arm 13 is in contact with the piston rod of shock absorber 45, their axes are not always normal to one another due to the arcuate movement of arm 13, thereby producing a force tending to bend piston rod 46. To eliminate this undesirable force on shock absorber 45, it is pivotally supported on bracket 50 through pin 51. As best shown in Fig. 5, bracket 50 forms a rigid part of launcher frame 3. Since only limited pivotal movement is necessary to remove the bending stresses from shock absorber 45, a leaf spring 52 is rigidly secured thereto at 53 for urging the shock absorber into a desired pivotal position. This leaf spring is received in a slot 54 formed in a cross member 55 secured to bracket 50. This arrangement allows shock absorber 45 limited pivotal movement about pin 51 against the action of spring 52 for minimizing the bending moments produced by arm 13 when its axis is not normal to the shock absorber piston rod.

As a safety device, in the event that all the kinetic energy in arm 13 is not absorbed by the shock absorber, a lock may be provided to prevent rebound of arm 13 after the shock absorber has halted its movement in one direction. A suitable lock 56 is shown in Fig. 6 wherein a pawl 57 pivoted at 58 to bellcrank 7 is adapted to engage a pin 59 secured to a bracket 60 on arm 13. A stop 61 is carried on bellcrank 7 to maintain pawl 57 in a position wherein it may properly engage pin 59.

The use and operation of the launcher is believed obvious from a reading of the foregoing description. In loading, the launched cylinder 12 is actuated so as to retract bed 5 to the position indicated in Fig. 1. In this position, arm 13 is locked in position by means of the automatically actuated locking arms 34. An aircraft, such as aircraft 2, is hoisted into position on the launcher so that its tail portion rests on cradle 33 at the rearward end of bed 5 and so that recesses 16 formed on either side of the aircraft fuselage receive the spherical tip portions 15' on arm 13. In this position, the aircraft is restricted from moving relative to the launcher except in a vertically upward direction against the force of gravity. Since an aircraft is relatively heavy, movement against gravity relative to the launcher is unlikely even when being transported over rough roads. However, it would be a very simple matter to strap the aircraft to the launcher to prevent such movement if it were so desired.

At the launching site, the aircraft is readied for flight. If the location is on soft or muddy ground, jack pads 62, carried by the launcher frame 3, may be lowered into position contacting the ground to provide additional support for steadying the launcher. Jack pads 62 may also be used for leveling the launcher if deemed necessary. After the final adjustments have been made on the aircraft, cylinder 12 is actuated, causing bellcrank 7 to pivot about shaft 8 so as to move launcher bed 5 upwardly and rearwardly to the launching position shown in Fig. 4. In this position, lock 34 is unlocked due to the relative movement between bellcrank 7 and bed 5, releasing arm 13 so that it may freely swing about pin 14. Latch 27, as shown in Fig. 2, automatically drops into the locked position to prevent retraction of the launcher bed. Movement of the launcher bed beyond the desired launching position is prevented by means of stop 25 also shown in detail in Fig. 2.

With the aircraft resting on the launcher in a predetermined attitude as determined by the launcher design, the thrust motors are ignited, producing a reaction causing the aircraft to move forward on a flight path determined by the position of the thrust axes of the power plants relative to the aircraft center of gravity. Because of the high power required for this type of launching, the aircraft accelerates very rapidly, imparting a rotational velocity to arm 13 about its pivots. After the aircraft has moved far enough so that the spherical tip portions of arm 13 disengage recesses 16, arm 13 swings freely about its pivot until it contacts the shock absorber piston rod, as best shown in Fig. 6. The kinetic energy in arm 13 is absorbed by further movement against the action of the shock absorber. When the arm has swung to its extreme position as shown in Fig. 6, pawl 57 engages pin 59 on arm 13 to prevent rebound movement thereof which would otherwise occur in the event that all the energy in the swinging arm is not absorbed in the shock absorber. The use of pawl 57 and pin 59 is obviously not necessary to the proper operation of the launcher so long as all or substantially all of the energy is taken up by the shock absorber.

The angular position of arm 13 relative to the aircraft flight path is quite important to the successful operation of this launcher since it is absolutely necessary not to interfere with the motion of the aircraft as it leaves the launcher. Therefore, arm 13 is located so as to extend substantially normal to the aircraft flight path whereby swinging motion about its pivot as the aircraft leaves the launcher is always away from the aircraft and not towards it.

Also, as shown in Fig. 4, arm 13, in the launching position, extends rearwardly as well as upwardly relative to its pivot pin 14 so that the weight of the aircraft urges it to remain in place against the ends of beams 17 and 18. This is essential to prevent the aircraft from moving forwardly relative to the launcher as soon as lock 34 releases arm 13.

After launching the aircraft, latch 27, shown in Fig. 3, is manually actuated so as to disengage pin 29. At the same time, arm 13 is swung back into position for supporting another aircraft. Cylinder 12 is then actuated to retract the launching bed to the position shown in Fig. 1. As the bed moves to the retracted position, lock 34 is caused to swing into contact wtih pin 39 as shown in Fig. 3, and lock arm 13 in position. The launcher is then ready to support another aircraft for transport and launching.

It is to be understood that certain changes, alterations, modifications and substitutions can be made without departing from the spirit and scope of the appended claims.

I claim as my invention:

1. A zero-length launcher adapted to support an aircraft for transport and launching comprising, a frame, wheels carried by said frame to facilitate moving said launcher to a launching site, a bed swingably carried by said frame and adapted from movement from a retracted position generally parallel with said frame to an upwardly and forwardly inclined launching position angularly displaced from said parallel position, actuating means connecting with said frame and bed for causing said movement from a retracted to a launching position, an arm swingably carried by said bed adjacent the forward end thereof, said arm having means on the free end thereof adapted to engage and support the forward portion of said aircraft so as to prevent independent relative longitudinal movement thereof, a cradle carried by said bed providing additional support for said aircraft rearwardly of said arm, latch means carried by said bed and adapted to engage said arm to support it in a generally upwardly extending position relative to said bed for preventing swinging movement of said arm, means responsive to relative movement between said bed and actuating means for actuating said latch means to unlock said arm when said bed is moved into launching position whereby said arm may swing forwardly and downwardly about its pivot to permit forward motion of said aircraft, and means carried by said frame in the path of such swinging movement of said arm for limiting the swinging movement thereof.

2. A zero-length launcher for launching aircraft comprising, a bed, a cradle carried by said bed adjacent the rearward end thereof providing support for the rear portion of said aircraft, and an arm swingably carried by said bed adjacent the opposite end thereof and providing a second support for the forward portion of said aircraft, said arm in launching position extending upwardly and rearwardly and generally normal to the intended flight path of said aircraft whereby said arm is urged to swing in a rearward direction due to the weight of said aircraft while being free to swing forwardly during launching to permit unrestrained movement of said aircraft along its flight path, said arm, when in launching position, engaging a portion of said bed to prevent rearward swinging of said arm.

3. A zero-length launcher adapted to support an aircraft for launching comprising, a frame, a bed carried by said frame and adapted for movement from a retracted position generally parallel with said frame to a launching position angularly displaced from said parallel position, actuating means connecting with said frame and bed for causing said movement from a retracted to a launching position, and an arm swingably carried by said bed adjacent the forward end thereof and having its free end adapted to engage said aircraft for supporting said aircraft, said arm being free to swing forwardly from a supporting position extending upwardly from said bed generally normal to the intended flight path of said aircraft to permit unrestrained movement thereof along said flight path when launched.

4. A zero-length launcher adapted to support an aircraft for launching comprising, a frame, a bed arranged longitudinally of said frame for carrying said aircraft, said bed having one end formed as a track, rollers carried by said frame and adapted to engage said track for supporting one end of said bed, a bellcrank pivotally carried by said frame and having one arm pivotally connecting with the opposite end of said bed, an actuating cylinder carried by said frame and connecting with the other arm of said bellcrank for raising said bed into launching position, an arm swingably carried by said bed adjacent said bellcrank and having its free end arranged to engage the forward portion of said aircraft for supporting said aircraft and preventing independent relative longitudinal movement thereof, latch means carried by said bed and arranged to engage said arm and hold it in a position extending generally upwardly from its pivotal connection with said bed, means responsive to relative movement between said bed and bellcrank for actuating said latch to release said arm when said bed is moved into launching position whereby said arm may swing forwardly and downwardly about its pivot to permit forward motion of said aircraft when launched, and a shock absorber carried by said frame and positioned relative to said arm so as to be engaged thereby to absorb the energy of said swinging arm to prevent rebound into the path of said aircraft.

5. A zero-length launcher adapted to support an aircraft for transport and launching comprising, a frame, wheels carried by said frame to facilitate moving said launcher to a launching site, a bed carried by said frame and adapted for movement from a retracted position relative to said frame to a launching position displaced from said retracted position, actuating means connecting with said frame and bed for causing said movement from a retracted to a launching position, an arm swingably carried by said bed adjacent the forward end thereof and providing support for the forward portion of said aircraft, a cradle carried by said bed providing a second support for the rearward portion of said aircraft, and latch means carried by said bed and engaging said arm to prevent swinging movement of said arm while said bed is in its retracted position whereby to restrain relative movement of said aircraft, and means operatively connected to said latch and controlled by the movement of said bed from retracted to launching position to actuate said latch for freeing said arm when said bed is in said launching position.

6. A zero-length launcher for aircraft comprising a frame, a bed carried by said frame and adapted for movement from a retracted position relative to said frame to a launching position displaced from said retracted position, actuating means connecting with said frame and bed for causing said movement from a retracted to a launching position, a cradle carried by said bed adjacent the rear end thereof for supporting the rear portion of said aircraft, and an arm swingably carried by said bed adjacent the opposite end thereof, the free end of said arm being adapted to engage and support the forward portion of said aircraft, said arm when thus engaged with said aircraft extending upwardly from said bed generally normal to the longitudinal axis of said aircraft to permit unrestrained forward movement of said aircraft during launching.

7. A zero-length launcher for launching aircraft comprising, a frame, a bed carried by said frame and adapted for movement from a retracted position relative to said frame to a launching position displaced from said retracted position, actuating means connecting with said frame and bed for causing said movement from a retracted to a launching position, an arm swingably carried by the forward portion of said bed and having its free end adapted to engage and support the forward portion of said aircraft, said arm when thus engaged with said aircraft extending generally upwardly from said bed whereby during launching of said aircraft said arm will swing forwardly and downwardly out of engagement with the aircraft, and shock absorbing means carried by said frame for limiting the swinging movement of said arm and preventing rebound thereof into the path of said aircraft.

References Cited in the file of this patent
UNITED STATES PATENTS 2,135,033    Courtney _____ Nov. 1, 1938

FOREIGN PATENTS 482,057    Great Britain _____ Mar. 23, 1938